Sept. 24, 1963    H. C. BODE    3,104,462
ASSEMBLING TOOL
Filed Aug. 12, 1960    2 Sheets-Sheet 1

INVENTOR.
Harold C. Bode
BY
Bacon & Thomas
ATTORNEYS

Sept. 24, 1963  H. C. BODE  3,104,462
ASSEMBLING TOOL
Filed Aug. 12, 1960  2 Sheets-Sheet 2
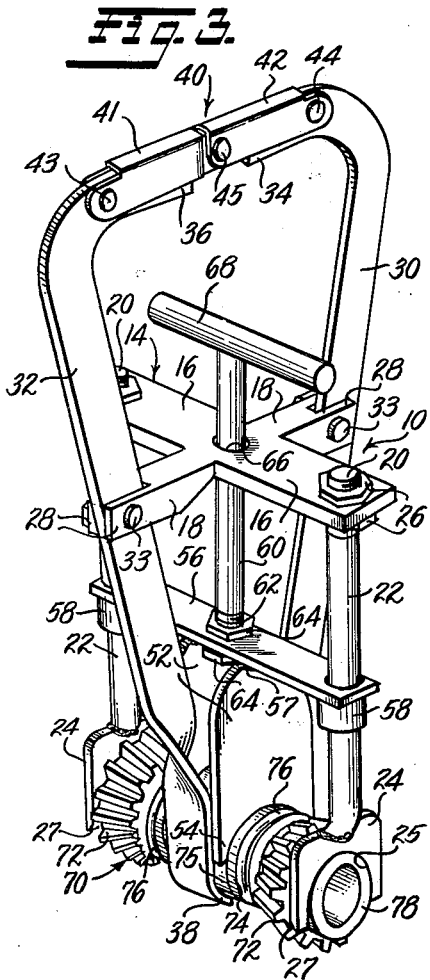
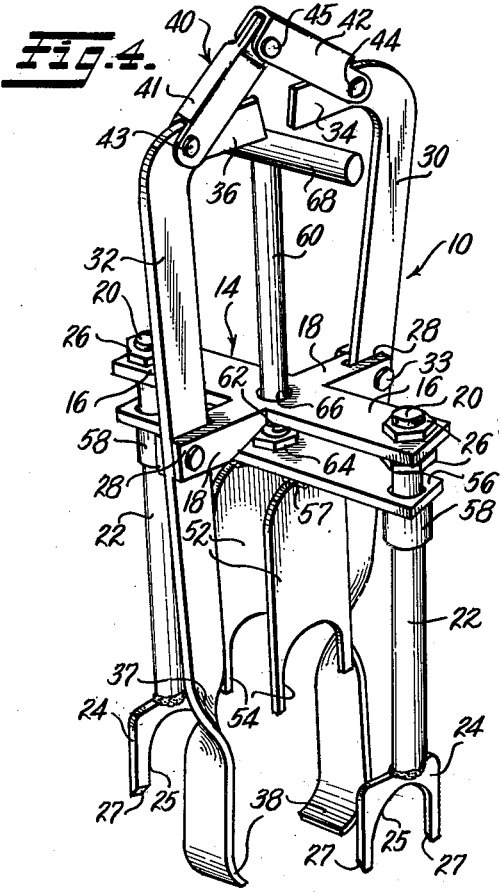
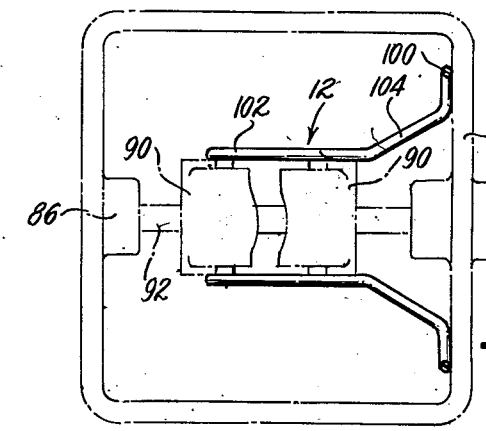
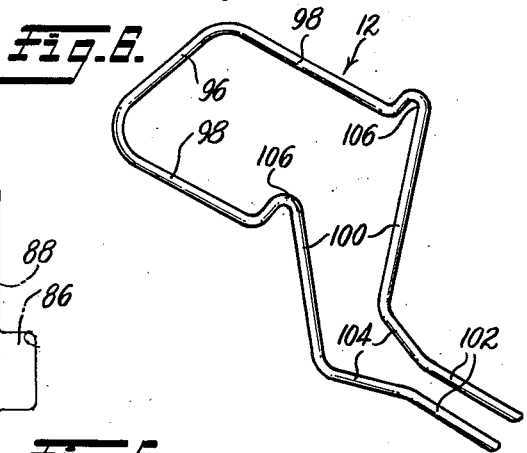
INVENTOR.
Harold C. Bode
BY
Bacon & Thomas
ATTORNEY

United States Patent Office 3,104,462
Patented Sept. 24, 1963

3,104,462
ASSEMBLING TOOL
Harold C. Bode, 301 E. Kellam, Chamberlain, S. Dak.
Filed Aug. 12, 1960, Ser. No. 49,295
10 Claims. (Cl. 29—271)

This invention relates to a novel assembly tool for manipulating gear assemblies and the like, and specifically to a novel tool adapted for the installation and removal of a gear assembly from the gear casing of a washing machine.

The removal or installation of the gear assembly in many types of washing machines is a very tedious task, especially where the gears must be lowered in place in a gear casing and held in position, with reference to shifter forks, while a shaft is passed through bearings in the walls of the gear casing and through the gear assembly. Such gear assemblies frequently employ springs tending to urge various parts away from one another, which springs must be manually compressed while the assembly is being installed within the gear casing or removed therefrom. Such gear casings are frequently rather small, providing space for the gear assembly, but not for the hand of a person manipulating the assembly into position.

It is an object of the present invention, therefore, to provide a novel tool by which the various parts of a gear assembly may be gripped and retained in proper relative position while being installed into, or being removed from, a gear casing.

It is a further object to provide a novel tool, as indicated above, having a supplemental part or holder adapted to engage and retain the shifter forks in the gear casing in proper position to receive the gear assembly when being installed.

Another object is to provide a tool for the purpose described that can be locked about the gear assembly, so that only one hand is required to lower the tool and gear assembly into the gear casing, thus leaving the other hand free to insert the shaft.

It is a still further object to provide a novel tool for the purpose mentioned, which is simple in construction, which includes very few parts, and which is exceedingly simple and effective in operation.

Other and further objects of the invention will be apparent from the following description, taken in conjunction with the accompanying drawings in which:

FIG. 3 is a perspective view of the tool in clamping or locked position, and engaging a gear assembly;

FIG. 4 is a perspective view, similar to FIG. 3, but illustrating the tool in open or unlocked position;

FIG. 5 is a horizontal sectional view through the shifter fork holder taken on the line 5—5 of FIG. 1, the gear casing being shown in dotted lines for clarity; and FIG. 6 is a perspective view of the shifter fork holder shown in FIG. 1.

Figures 1, 2:
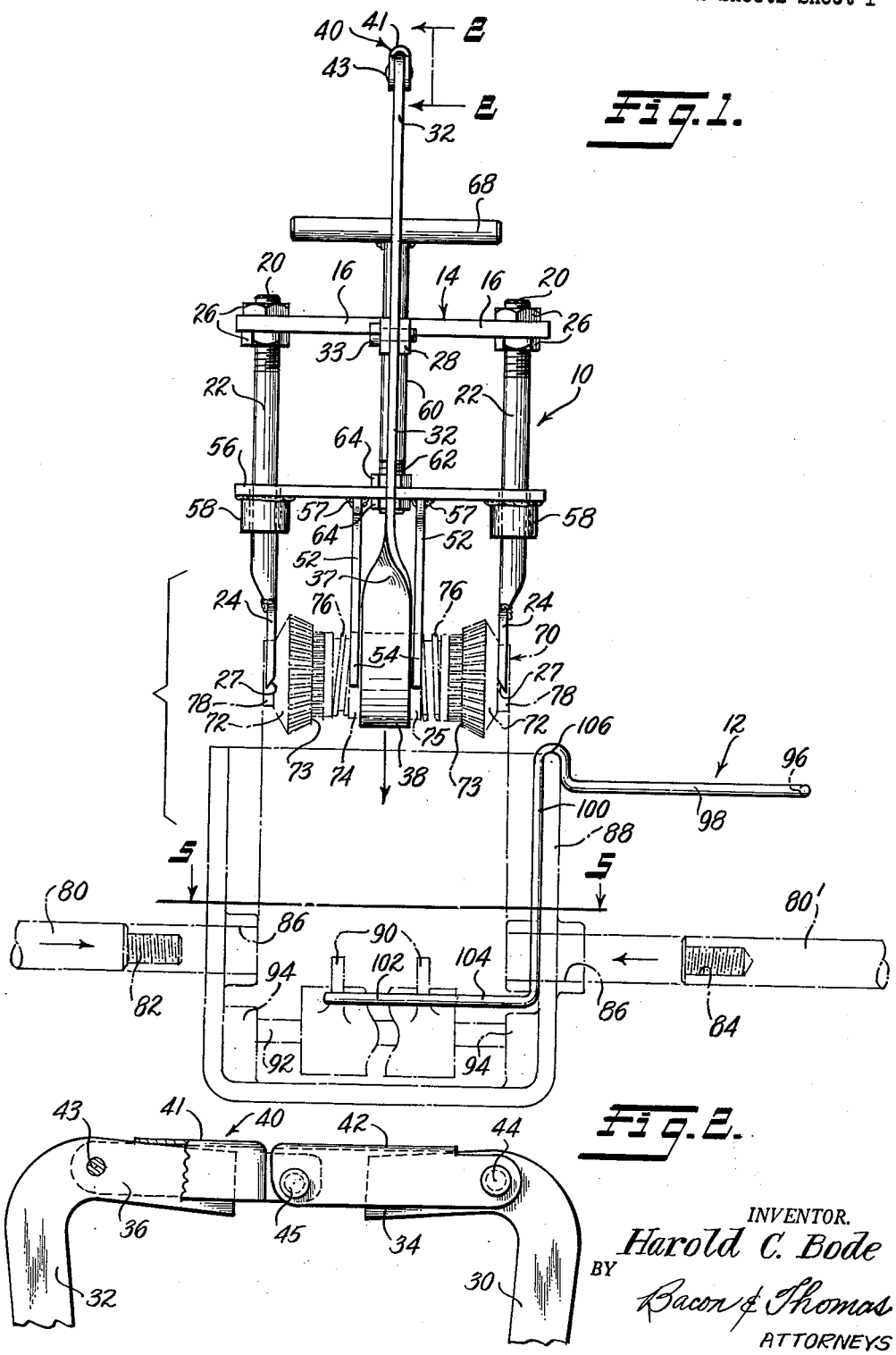
FIG. 1 is a side elevation of the tool and shifter fork holder of the present invention in full lines, with the gear casing and related parts shown in dotted lines for clarity.
FIG. 2 is an enlarged fragmentary view of a toggle mechanism for locking the main tool about a gear assembly, as viewed in the direction of the arrows on line 2—2 of FIG. 1.

The tool forming the subject matter of this invention comprises a clamping and manipulating tool 10 adapted to grip and retain various portions of a gear assembly in proper relationship while being removed from, or installed within, a gear casing, and a shifter fork retaining tool 12, which is adapted to retain shifter forks in proper position relative to the gear assembly to facilitate assembly of the latter within the gear housing, as will be more fully set out below.

Referring to FIGS. 1, 3 and 4, the gear manipulating tool 10 comprises a supporting frame member 14, generally cruciform, having a pair of opposed long arms 16, and a pair of short arms 18, the arms 16 and 18 being disposed at 90° relative to one another. The outer ends of the long arms 16 are bored to receive the threaded ends 20 of a pair of depending rods 22, the lower ends of which are provided with forks 24 having their slotted portions 25 axially aligned as more clearly shown in FIG. 4. Pairs of spaced nuts 26 are threaded onto the threaded ends 20 of the rods 22 to engage the upper and lower surfaces of the arms 16 to maintain the rods rigidly in position.

The outer ends of the short arms 18 are bifurcated at 28 to pivotally mount a pair of tong members 30 and 32 by pivot pins 33 passing through the bifurcations 28 and through the tong members 30 and 32 at points intermediate their ends. The upper end portions of the tong members 30 and 32 are curved inwardly at 34 and 36, respectively, and their lower ends are twisted through an angle of 90°, as shown at 37, and terminate in an inwardly extending arcuate portion or jaw 38 for a purpose to be explained hereinafter. The upper end portions 34 and 36 are bent through an angle greater than 90° whereby the extensions of the upper edges will form an angle, relative to each other, less than 180°, as is best shown in FIG. 2.

A toggle mechanism 40 is connected with the curved end portions 34 and 36 of the tong members 30 and 32 to facilitate the spreading of the jaws 38 and to lock them in gripping position, as explained later. The toggle mechanism 40 comprises a pair of links 41 and 42 pivotally connected, at their outer ends, with points remote from the ends of the curved end portions. Each link is U-shaped in cross-section to straddle one of the end portions 34 and 36. Pivot pins 43 and 44 pass through aligned openings in one end of the link 41 and the end portion 36, and through one end of the link 42 and the end portion 34, respectively, to pivotally mount the links for limited movement. The free ends of the links 41 and 42 are pivotally interconnected by a pivot pin 45.

A pair of spaced, parallel straps 52, having forked ends 54 are secured to a transversely extending guide member 56, as by welding 57. The guide member 56 extends in a direction parallel with the cross arms 16 of the frame member 14, and is disposed below these arms. The outer ends of the guide member 56 each carry a guide bearing 58, which slides on one of the rods 22, permitting upward and downward movement of the straps 52 and the guide member 56 relative to the frame member 14 and the rods 22. Another rod 60, having a threaded end 62, passes through a transverse aperture in the guide member 56 and is secured thereto by a pair of spaced nuts 64 engaging the upper and lower surfaces of the guide member 56. The rod 60 also passes through an aperture 66 in the central portion of the frame member 14, and is provided with a handle 68 at the upper end thereof, which is disposed parallel with the arms 16.

FIGS. 1 and 3 illustrate a gear assembly 70 of the type used in a "Maytag" wringer type washing machine, comprising a pair of spaced bevel gears 72, and an intermediate tubular member or sleeve 74. Coil springs 76 are disposed between the tubular member 74 and the bevel gears 72 and tend to urge the bevel gears apart. The tubular member 74 has a central enlarged cylindrical portion 75 that is adapted to be gripped by the arcuate jaws 38. The outer end of each of the bevel gears 72 is provided with a short hub 78 adapted to be straddled by the forked ends 24 of the rods 22. A two-part shaft 80, 80', is adapted to rotatably support the gear assembly 70. This shaft is inserted through the gear assembly by passing the respective parts 80 and 80' through axially aligned bearings 86 in a gear casing 88, after the gear assembly 70 is positioned in said casing. To facilitate assembly, the shaft portion 80 is provided with a threaded stud 82 adapted to be received within a threaded bore 84 in the shaft portion 80'.

Referring to FIGS. 1 and 5, the lower portion of the gear casing 88 carries a pair of shifter forks 90 slidingly mounted upon a shaft 92 supported in recesses in bosses 94 on the side walls of the gear casing 88. Each of the beveled gears 72 has an abutment 73 formed by cutting away a portion of its teeth. Each abutment 73 is engageable by one of the shifter forks 90.

The shifter forks 90 include jaws for engaging the sleeve 74 or the abutments 73 on the gears 72 to clutch one or the other of the gears to transmit motion in a well known manner. Since the forks 90 are slidably mounted on the shaft 92, it is evident that some means must be provided to retain them in their proper position along the shaft 92 while the gear assembly is being installed to assure that the jaws will mate with their cooperating members.

The object of the shifter fork retaining tool 12 is to retain the shifter forks 90 in proper spaced relation during the mounting of the gear assembly 70 in the gear casing 88, and for this purpose said tool is made generally of U form (FIGS. 1, 5 and 6), having a bight portion 96, a pair of parallel horizontal upper portions 98 adjacent the bight portion, a pair of depending portions 100, and a pair of parallel, horizontal end portions 102. The depending portions 100 converge toward their lower ends and are connected by converging portions 104 with the parallel end portions 102. A loop 106 is provided between each upper portion 98 and a depending portion 100, to permit mounting and retention of the retaining tool 12 on the upper edge of the gear casing 88, as seen in FIG. 1. The end portions 102 engage the shifter forks 90 as shown in FIGS. 1 and 5 to retain them against axial and rotary motion during assembly.

With further reference to FIGS. 1 and 5, it will be noted that the portions 98 of the tool 12 are parallel, and that the portions 102 are also parallel; that the portions 102 and 104 lie in the same horizontal plane; and that the plane of the portions 98 on the one hand, and the plane of the portions 102 and 104 on the other hand, are parallel but vertically offset. It should also be noted that the portions 100 lie in a plane disposed at 90° relative to the planes occupied by the portions 98, and 102 and 104.

If it is desired to remove the gear assembly 70 from the gear casing 88, the toggle mechanism 40 is moved to its unlocked position by raising the pivot connection 45, whereby the end portions 34 and 36 of the tong members 30 and 32 are brought together as shown in FIG. 4, to move the arcuate portions or jaws 38 apart. The spacing between the lower ends of the jaws 38, when the parts are in the position shown in FIG. 4, is sufficient to provide clearance in passing about the tubular member 74. The handle 68 is lifted to raise the straps 52, as shown. By grasping the handle 68 and the upper curved ends 34 and 36 of the tong members, including the toggle mechanism 40, the tool 10 can be lowered into the gear casing 88 into a position such that the forks 24 on the lower ends of the rods 22 straddle the hubs 78 on the bevel gears 72 and limit the downward movement of the tool 10. In this connection, the lower extremities of the forks 24 are beveled inwardly and upwardly, as indicated at 27, to facilitate engagement thereof with the portion of the bevel gears 72 adjacent their hub 78. The handle 68 is then pushed downwardly until the forked ends 54 on the straps 52 engage the upper periphery of the tubular member 74. The guide member 56 is effective to retain the straps 52 and the forked ends 54 thereon in parallel relation with the forks 24.

When the forked ends 54 of the straps 52 engage the tubular member 74, as described above, the ends of the links 41 and 42 at the pivot 45 are pressed downwardly to spread apart the upper curved end portions 34 and 36 of the tong members 30 and 32, thereby causing the arcuate portions or jaws 38 on the lower ends of the tong members to contact with and grip the lower peripheral surface of the tubular member 74, as shown in FIG. 3. In this position, the pin 45 passes below a theoretical line connecting the pins 43 and 44, forming a toggle lock to retain the parts in locked condition, and the base of the U-shaped links 41 and 42 engage the upper surface of the end portions 36 and 34 to limit downward movement of the pin 45. The gear assembly 70 is thereby tightly gripped by the tool 10. The spacing of the straps 52 is sufficient to permit the arcuate portions 38 of the tong members 30 and 32 to lie therebetween, as seen in FIG. 3. The parts 80 and 80' of the shaft may then be separated and removed by unscrewing the threaded portions 82 and 84, permitting axial movement of the parts out of the casing 88 as shown in dotted lines in FIG. 1, whereupon the entire gear assembly 70 may be removed for inspection, repair or replacement. The springs 76 remain compressed and resiliently urge the bevel gears 72 apart and into tight engagement with the forks 24, as is clearly shown in FIG. 1.

When it is desired to re-install the gear assembly 70, or to install a new gear assembly, the parts are mounted in the tool 10, as shown in FIGS. 1 and 3. To facilitate such assembly, the parts can be temporarily mounted upon a shaft, which can be removed after the parts are tightly gripped by the tool 10.

It is necessary that the shifter forks 90, FIGS. 1 and 5, be retained in proper position during installation, and for this purpose the free ends 102 of the supplementary tool 12 are disposed on opposite sides of the shifter forks, as shown in FIG. 5, whereby the depending portions 100 engage the inner surface of the side wall of gear casing 88 and are retained therein by the loops 106 engaging and locking with the upper edge of said side walls, as shown in FIG. 1. The tool 10 and gear assembly 70 may then be lowered into position in the gear casing 88, as indicated by the arrow in FIG. 1. This can be done with one hand, and the other hand used to insert the two parts 80 and 80' of the shaft through the bearings 86 on opposite sides of the gear casing and into the hollow bevel gears 72 and tubular member 74. Once the shaft sections 80 and 80' are in position, both hands can be used to effect engagement of the threaded stud 82 and the threaded bore 84. After the shaft is installed, the links 41 and 42 can be raised to release the toggle connection, and the upper end portions 34 and 36 of the tong members 30, 32 brought together, as shown in FIG. 4, which permit spreading of the jaws 38. The handle 68 may then be gripped and the tool 10 removed from the gear casing 88. The shifter fork retaining tool 12 can be removed by lifting upwardly on the bight portion 96 to automatically spread apart the end portions 102 to clear the shifter forks thereby permitting easy removal of the tool 12.

From the foregoing, it is apparent that the tool 10 is very simple and efficient in facilitating the removal and installation of a gear assembly 70 within the gear casing 88, and that the tool tightly grips the various parts of the gear assembly to permit any manipulation necessary. It will also be apparent that shifter fork retaining tool 12 complements the tool 10 by holding the shifter forks 90 in proper position during installation of the gear assembly, so that they will be able to engage the abutments 73 on the gears 72 to shift the same in use.

While a single specific embodiment of the invention has been shown and described herein, the same is intended merely as illustrative of the principles of the invention. The invention contemplates other embodiments varying in structural details but nevertheless equivalent and falling within the scope of the appended claims.

I claim:
1. A tool for installing and removing a gear assembly from a gear casing, in which the gear assembly includes a pair of spaced gears, an intermediate sleeve between said gears, and a compression spring between the ends of the intermediate sleeve and the respective gears, comprising: a rigid frame; fixed means carried by the frame for engaging the spaced gears at points outwardly of the springs; and movable means carried by the frame from gripping the intermediate sleeve and for holding said gears engaged with said fixed means.

2. A tool as defined in claim 1, in which the gear-engaging means includes a pair of spaced rods rigidly attached to the frame and wherein said rods have forked ends for engaging hub extensions on the outer ends of the gears.

3. A tool as defined in claim 1, in which the means for gripping the intermediate sleeve includes a pair of tong members pivotally mounted intermediate the ends thereof upon pins extending parallel with the axis of said intermediate sleeve and carried by the frame, said tongs having lower ends for engaging the lower portion of said intermediate sleeve; and means connected with the ends of said tongs remote from said lower ends for operating said tongs.

4. A tool as defined in claim 1, in which the means for gripping the intermediate sleeve includes a pair of tong members pivotally mounted upon the frame having lower ends engageable with diametrically opposite sides of said intermediate sleeve; and toggle means connected with the upper ends of said tong members for actuating said tong members and for locking the same in sleeve-engaging position.

5. A tool for retaining one or more shifter forks in position within a gear casing, comprising: a generally U-shaped resilient member having spaced parallel end portions disposed in a common plane for engaging one or more shifter forks, a pair of spaced generally parallel handle portions disposed in a common plane adjacent the bight of the U and vertically offset from the plane of said end portions, and a pair of intermediate portions connected to and arranged at substantially a right angle relative to the end portions and to the handle portions adjacent the bight, said end portions including non-parallel portions in the common plane thereof connecting the same with said intermediate portions.

6. A tool as defined in claim 5, including loops at the junction of the intermediate portions and the handle portions for retaining the tool in predtermined position on the upper edge of a wall of the gear casing.

7. A tool for installing and removing a gear assembly from a gear casing, in which the gear assembly includes a pair of spaced gears, an intermediate sleeve and a compression spring between the ends of the intermediate sleeve and the respective gears, comprising: a frame; means carried by the frame for engaging the spaced gears at points outwardly of the springs; and means carried by the frame for gripping the intermediate sleeve including a pair of tong members pivotally mounted upon the frame having arcuate end portions, and strap means having at least one forked end, the arcuate end portions and the forked end being engageable with the peripheral surface of the intermediate sleeve at circumferentially spaced points to tightly grip said intermediate sleeve.

8. A tool for installing and removing a gear assembly from a gear casing, in which the gear assembly includes a pair of spaced gears, an intermediate sleeve and a compression spring between the ends of the intermediate sleeve and the respective gears, comprising: a frame; means carried by the frame for engaging the spaced gears at points outwardly of the springs; and means carried by the frame for gripping the intermediate sleeve, said gear-engaging means including a pair of spaced rods rigidly attached to the frame, said rods having forked ends to engage hub extensions on the outer ends of the gears, and said means for gripping the intermediate sleeve including a pair of tong members pivotally mounted upon the frame, strap means engageable with the intermediate sleeve, and means mounting said strap means on said frame for movement toward and away from said intermediate sleeve, said mounting means comprising a guide member having bearing engagement with said spaced rods, and a handle connected with said strap mounting means having a rod passing through an aperture in said frame.

9. A tool for installing and removing a gear assembly from a gear casing, in which the gear assembly includes a pair of spaced gears, an intermediate sleeve and a compression spring between the ends of the intermediate sleeve and the respective gears, comprising: a frame; means carried by the frame for engaging the spaced gears at points outwardly of the springs; means carried by the frame for gripping the peripheral surface of the intermediate sleeve including a pair of tong members pivotally connected intermediate their ends to said frame and having lower ends that grip said intermediate sleeve; and means mounted upon the upper ends of said tong members for locking said tong members in gripping position.

10. A tool for installing and removing a gear assembly from a gear casing, in which the gear assembly includes a pair of spaced gears, an intermediate sleeve and a compression spring between the ends of the intermediate sleeve and the respective gears, comprising: a frame; means carried by the frame for engaging the spaced gears at points outwardly of the springs; and means carried by the frame for gripping the intermediate sleeve including a pair of tong members pivotally mounted upon the frame having lower arcuate gripping ends for gripping said intermediate sleeve and strap means carried by said frame comprising a pair of spaced, parallel, strap members having forked ends, the forked ends and the arcuate gripping ends of said tongs being engageable with the peripheral surface of the intermediate sleeve at circumferentially spaced points to tightly grip said intermediate sleeve, the axial spacing of the forked ends being greater than the axial width of the arcuate ends of the tong members, whereby said arcuate ends, when in gripping position, lie within the space between the forked ends.

References Cited in the file of this patent
UNITED STATES PATENTS

| | | |
|---|---|---|
| 872,683 | Ray | Dec. 3, 1907 |
| 1,456,796 | Gross | May 29, 1923 |
| 1,540,760 | Cardin | June 9, 1925 |
| 1,540,815 | Steuart | June 9, 1925 |
| 1,601,752 | Wortham | Oct. 5, 1926 |
| 1,652,075 | Watson | Dec. 6, 1927 |
| 1,690,731 | Kulp et al. | Nov. 6, 1928 |
| 1,781,875 | Hopkins | Nov. 18, 1930 |
| 1,826,631 | Payne | Oct. 6, 1931 |
| 1,893,353 | Bergman et al. | Jan. 3, 1933 |
| 1,986,093 | Abernathy | Jan. 1, 1935 |
| 2,319,113 | Christman | May 11, 1943 |
| 2,429,327 | Morgan | Oct. 21, 1947 |
| 2,826,806 | McDonald | Mar. 18, 1958 |